US008902801B2

(12) United States Patent
Probst et al.

(10) Patent No.: US 8,902,801 B2
(45) Date of Patent: Dec. 2, 2014

(54) UNIVERSAL INTERFACE FOR A WIRELESS ADAPTER

(75) Inventors: Stefan Probst, Weil am Rhein (DE); Marc Fiedler, Reinach (CH)

(73) Assignee: Endress + Hauser Process Solutions AG, Reinach (CH)

( * ) Notice: Subject to any disclaimer, the term of this patent is extended or adjusted under 35 U.S.C. 154(b) by 0 days.

(21) Appl. No.: 12/451,952

(22) PCT Filed: Aug. 3, 2009

(86) PCT No.: PCT/EP2009/060031
§ 371 (c)(1),
(2), (4) Date: May 24, 2010

(87) PCT Pub. No.: WO2010/015601
PCT Pub. Date: Feb. 11, 2010

(65) Prior Publication Data
US 2011/0134817 A1 Jun. 9, 2011

(30) Foreign Application Priority Data

Aug. 8, 2008 (DE) .......................... 10 2008 036 967

(51) Int. Cl.
H04B 7/24 (2006.01)
G05B 19/042 (2006.01)
(52) U.S. Cl.
CPC .. G05B 19/0423 (2013.01); *G05B 2219/21116* (2013.01); *G05B 2219/25451* (2013.01)
USPC .......................................... 370/311; 370/463
(58) Field of Classification Search
CPC ................. G05B 19/0423; G05B 2219/25451; G05B 2219/21116

USPC ............ 370/311, 463; 710/305, 315; 455/522
See application file for complete search history.

(56) References Cited

U.S. PATENT DOCUMENTS

| 7,228,186 B2 | 6/2007 | Karschnia |
| 2004/0075566 A1 | 4/2004 | Stepanik |
| 2005/0065618 A1 | 3/2005 | Burkatovsky |
| 2005/0245291 A1 | 11/2005 | Brown |
| 2006/0092039 A1 | 5/2006 | Saito |
| 2006/0142875 A1 | 6/2006 | Keyes |
| 2006/0155908 A1 * | 7/2006 | Rotvold et al. ............... 710/315 |
| 2007/0243830 A1 | 10/2007 | Isenmann |
| 2008/0183935 A1 | 7/2008 | Guenter |
| 2009/0193169 A9 * | 7/2009 | Guenter et al. ............... 710/305 |

FOREIGN PATENT DOCUMENTS

| DE | 101 13 676 | 9/2002 |
| DE | 10 2006 055 900 | 6/2007 |
| WO | WO 2005/086110 | 9/2005 |
| WO | WO 2005/103851 | 11/2005 |

* cited by examiner

*Primary Examiner* — Pao Sinkantarakorn
*Assistant Examiner* — Richard Chang
(74) *Attorney, Agent, or Firm* — Bacon & Thomas, PLLC

(57) ABSTRACT

A universal interface for a wireless adapter, which supports a communication protocol used in automation technology, wherein associated with the wireless adapter are a first energy supply unit for energy supply of the wireless adapter and a radio module for communication with a superordinated control unit via a radio network, wherein provided on the interface are at least five connection terminals, which are so embodied that, as a function of a field installation that is to be connected, a portion of the connection terminals is connectable either with different embodiments of field devices or with a servicing device.

13 Claims, 6 Drawing Sheets

UNIVERSAL INTERFACE FOR A WIRELESS ADAPTER

TECHNICAL FIELD

The invention concerns a universal interface for a wireless adapter, which supports a communication protocol used in automation technology, wherein a first energy supply unit for the energy supply of the wireless adapter and a radio module for communication with a superordinated control unit via a radio network are associated with the wireless adapter.

BACKGROUND DISCUSSION

In process automation technology, field devices are often applied for registering and/or influencing process variables. Serving for registering process variables are sensors, such as, for example, fill level measuring devices, flow measuring devices, pressure and temperature measuring devices, pH-redox potential measuring devices, conductivity measuring devices, etc., which register the corresponding process variables, fill level, flow, pressure, temperature, pH-value, or conductivity. Actuators are for influencing process variables, as, for example, valves or pumps, via which the flow of a liquid in a section of pipeline, or the fill level in a container, can be changed. In principle, all devices, which are applied near to the process and which deliver or process process-relevant information are referred to as field devices. Besides the aforementioned sensors and actuators, units which are connected directly to a fieldbus and are for the communication with the superordinated units are generally also referred to as field devices, such as e.g. remote I/Os, gateways, linking devices and wireless adapters. A large number of such field devices are produced and sold by the Endress+Hauser-Group.

In modern industrial plants, field devices are connected with superordinated units, as a rule, via bus systems (Profibus®, Foundation® Fieldbus, HART®, etc.). Normally the superordinated units involve control systems, or control units, such as, for example, a PLC (programmable logic controller). The superordinated units are for, among other things, the process control, process visualizing, process monitoring as well as the start-up of the field devices. The measured values registered by the field devices, especially by sensors, are transmitted via the connected bus system to one or, in given cases, also to a number of superordinated unit(s). Along with that, a data transmission from the superordinated unit via the bus system to the field devices is also required; this is especially for the configuring and parametering of field devices or for diagnostic purposes. Speaking generally, the field device is serviced via the bus system from the superordinated unit.

Besides a hardwired data transmission between the field devices and the superordinated unit, there is also the opportunity for a wireless data transmission. Especially in the bus systems Profibus®, Foundation® Fieldbus and HART®, a wireless data transmission via radio is specified. Additionally, radio or wireless networks for sensors are specified in the standard IEUE 802.15.4 in greater detail. For implementing a wireless data transmission, newer field devices, especially sensors and actuators, are embodied partially as radio-field devices. These have, as a rule, a radio unit and an electrical current source as integral components. In such a case, the radio unit and the electrical current source can be provided in the field device itself or in a radio module connected durably to the field device. Through the electrical current source, an autarkic energy supply of the field device is enabled.

Along with that, there is the opportunity to equip field devices that do not have radio units—thus the installed base—with a radio-field device through the coupling with, in each case, a wireless adapter which has a radio unit. A corresponding wireless adapter is described, for example, in the publication WO 2005/103851 A1. The wireless adapter is, as a rule, releasably connected to a fieldbus communication interface of the field device. Via the fieldbus communication interface, the field device can transmit the data that is transferred over the bus system to the wireless adapter, which then transmits this via radio to the target location. Conversely, the wireless adapter can receive data via radio and forward it to the field device via the fieldbus communication interface. Supplying the field device with electrical power can occur via an energy supply unit of the wireless adapter.

In the case of autarkic radio-field devices and wireless adapters, the communication, for example, with a superordinated unit, is conducted as a rule via the wireless interface of the radio-field device or the wireless adapter. Additionally, such radio-field devices, or wireless adapters, have, as a rule, a hardwired communication interface. For example, in the HART-standard, it is provided that radio-field devices must also have, besides a wireless interface, a hardwired communication interface. Via such a hardwired communication interface, much is possible, for example, local configuration of the radio-field device, or of the wireless adapter, via a service unit, such as, for example, a handheld communicator that is connected to the hardwired communication interface. Additionally, the hardwired communication interface can be embodied as a fieldbus communication interface, so that communication is conducted corresponding to a bus system, such as, for example, one of the standardized bus systems Profibus®, Foundation® Fieldbus or HART®. Via such a fieldbus communication interface, the radio-field device, or the wireless adapter, can also be connected to a corresponding hardwired fieldbus.

The energy supply unit, or the electrical current source, of a wireless adapter or of a radio-field device is, for example, a battery provided in the wireless adapter or in the radio-field device, a fuel cell, a solar energy supply and/or a rechargeable battery.

In the installed base, the most varied of types of field installations are found: Many of the field devices are embodied as 4-20 mA field devices. Here the analog 4-20 mA-electrical current value represents the measured value. Additionally, a digital communication can be superimposed on the electrical current signal, which is usually based on the HART protocol, but it does not have to be. The term 'field installation' subsumes, besides the two-wire field devices, naturally also four-wire-field devices; furthermore, servicing devices fall under the term, which, for example, are used for parametering the wireless adapter, or also the application of the wireless adapter in modem operation.

A wireless adapter, which is designed at least for one protocol used in automation technology for digital communication, is usually tailored to the particular field installation. In the case of the known solution, the necessary flexibility to apply the wireless adapter to different field installations is missing. It is obvious that the conventional solutions to it, consequently, are implemented very complexly.

SUMMARY OF THE INVENTION

An object of the invention is to provide a universal interface for a wireless adapter, which enables flexible connection opportunities of different field installations to a wireless adapter.

The object is achieved in that at least five connection terminals are provided on the interface. The terminals are so embodied, that as a function of the, in each case, field installation that is to be connected, in each case, a portion of the connection terminals is connectable either with different embodiments of field devices or with a servicing device. The term 'field installation' is meant to include the differently designed types of field devices, thus two-wire- or four-wire-field devices; according to the invention, however, servicing devices are also included, which, for example, are used for parametering the wireless adapter. Another important application is the use of the wireless adapter in modem operation. Through multiple utilizations of connection terminals in the case of different field installations, the number of connection terminals can be significantly reduced or minimized. In particular, it is achieved through the inner circuit of the connection terminals that different connection terminals, depending on application, have different functions and are connected in different combinations with the field installations. A flexible connection concept for a wireless adapter is thus described here, which permits different sensors/measurement transmitters to connect simply, or the wireless adapter to integrate easily into existing applications, or, if desired by the customer, to implement special interconnections.

An advantageous embodiment of the interface of the invention provides that the first connection terminal involves an energy supply terminal, to which the energy supply unit is connected.

Moreover, it is provided that the second connection terminal involves a first communication terminal, which supports digital communication corresponding to the communication protocol and/or the ascertaining of the analog electrical current signal. The communication protocol supports preferably the HART standard, since HART field devices have the greatest distribution in automation technology. Of course, other communication protocols that are used in automation technology can be supported as well. In given cases, other connection terminals are then to be provided. By way of example, besides the HART-protocol, the Profibus protocol or the Foundation Fieldbus protocol are also possible.

If the measured value determination occurs conventionally by means of an analog electrical current signal, then the 4-20 mA signal is preferably used, because this standard has become common in process automation technology.

In a first embodiment of the interface of the invention, a two-wire field device fed by the energy supply unit of the wireless adapter is connected to the first connection terminal and to the second connection terminal. In the case of a two-wire field device, the energy supply and the providing of the measured value occur via the same two-wire line. The energy supply of the field device occurs, in this case, via the energy supply unit integrated into the interface. The energy supply unit is, for example, a battery, a solar panel, a rechargeable battery or a fuel cell.

An advantageous embodiment of the interface of the invention provides a third connection terminal, in which case such is, depending on the connected field installation, either a ground terminal for an external energy supply unit or a bridge, which provides connection to the fifth connection terminal, which is described in greater detail below.

In an advantageous embodiment of the interface of the invention, a four-wire-field device, which is supplied with energy via a first two-wire line and an external energy supply unit, is connected via the second connection terminal and the third connection terminal with the wireless adapter. Thus the digital communication signal and/or the electrical current signal representing the measured value are transmitted as a function of the respective field installation via the second two-wire line connected to the second connection terminal and to the third connection terminal of the wireless adapter.

Moreover, it is provided that a fourth connection terminal involves a second communication terminal, which supports digital communication corresponding to the respective communication protocol of the field installation.

Moreover, it is seen as advantageous when the fourth connection terminal is doubly embodied, or when the two connection terminals work functionally equally, since they are connected via a bridge with one another.

In an advantageous further development of the interface of the invention, it is provided that, for the case in which a two-wire field device and an external energy supply unit are to be connected separately to the wireless adapter, the two-wire field device is connected to the second connection terminal and to the fourth connection terminal, and that the external energy supply unit is connected with the third connection terminal and the fourth connection terminal.

Furthermore, it is provided that a fifth connection terminal, depending on connected field installation, involves either a high-resistance ground connection or a bridge to the third connection terminal.

In connection with the present invention, it is considered advantageous when, for the case in which the wireless adapter is used in a two-wire field device for modem operation, the fourth connection terminal and the fifth connection terminal are connected via the two communication lines to the two-wire line, which connects the two-wire field device with the external energy supply unit and via which the digital communication occurs.

For the case that the wireless adapter works in modem operation in the case of a field device fed via the external energy supply unit, it is provided that the external energy supply unit is connected with the third connection terminal and the fourth connection terminal, wherein the third connection terminal and the fifth connection terminal are connected with one another via a bridge, and wherein the field device is connected to the wireless adapter via the fourth connection terminal and the fifth connection terminal.

As already stated, the wireless adapter can also be connected with a servicing device via the interface for the purpose of parametering or diagnosis. In such a case, the servicing device is connected to the fourth connection terminal and the fifth connection terminal.

In order to be able to apply the wireless adapter of the invention without limitation and thus also in explosion-endangered areas, it is provided that each of the connection terminals has either a voltage limiter and/or electrical current limiting, which are/is so designed, that, when connecting the respective field installation to the wireless adapter, the available power is so dimensioned, that the use of the wireless adapter in connection with the field installation is possible in the explosion-endangered area. Especially in the case of all application opportunities, explosion protection is assured. Particularly, it is also avoided, in the case of a defective connection of the field installation to the wireless adapter, that the maximum allowable power transmission for the explosion endangered area is exceeded.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

In FIGS. 1 to 6, the circuit components of the interface I of the wireless, or radio, adapter are, in each case, identical. The occupation of the connection terminals A, B, C, Da, Db, E is changed depending on field installation. The interface I of the invention is so executed that the individual connection terminals A, B, C, Da, Db, E are usable in different combinations. So that the wireless adapter can also be used in an explosion-protected area, precautionary measures are made in the illustrated embodiments, which—depending on field installation—limit the electrical current or the voltage to allowable limit values.

The active components of the interface I, depending on the connected field installation, are emphasized in FIGS. 1 to 6 by thicker lines. Of course, the designating of the connection terminals A, B, C, Da, Db, E from the first connection terminal A up to the fifth connection terminal E represents no limitation as regards the arrangement or sequence of the connection terminals A, B, C, Da, Db, E on the wireless adapter.

The wireless adapter, which is not explicitly presented in the figures, includes, moreover, a radio module RM, which enables the wireless communication with a superordinated control unit CT via the radio network RN.

Figure 1:
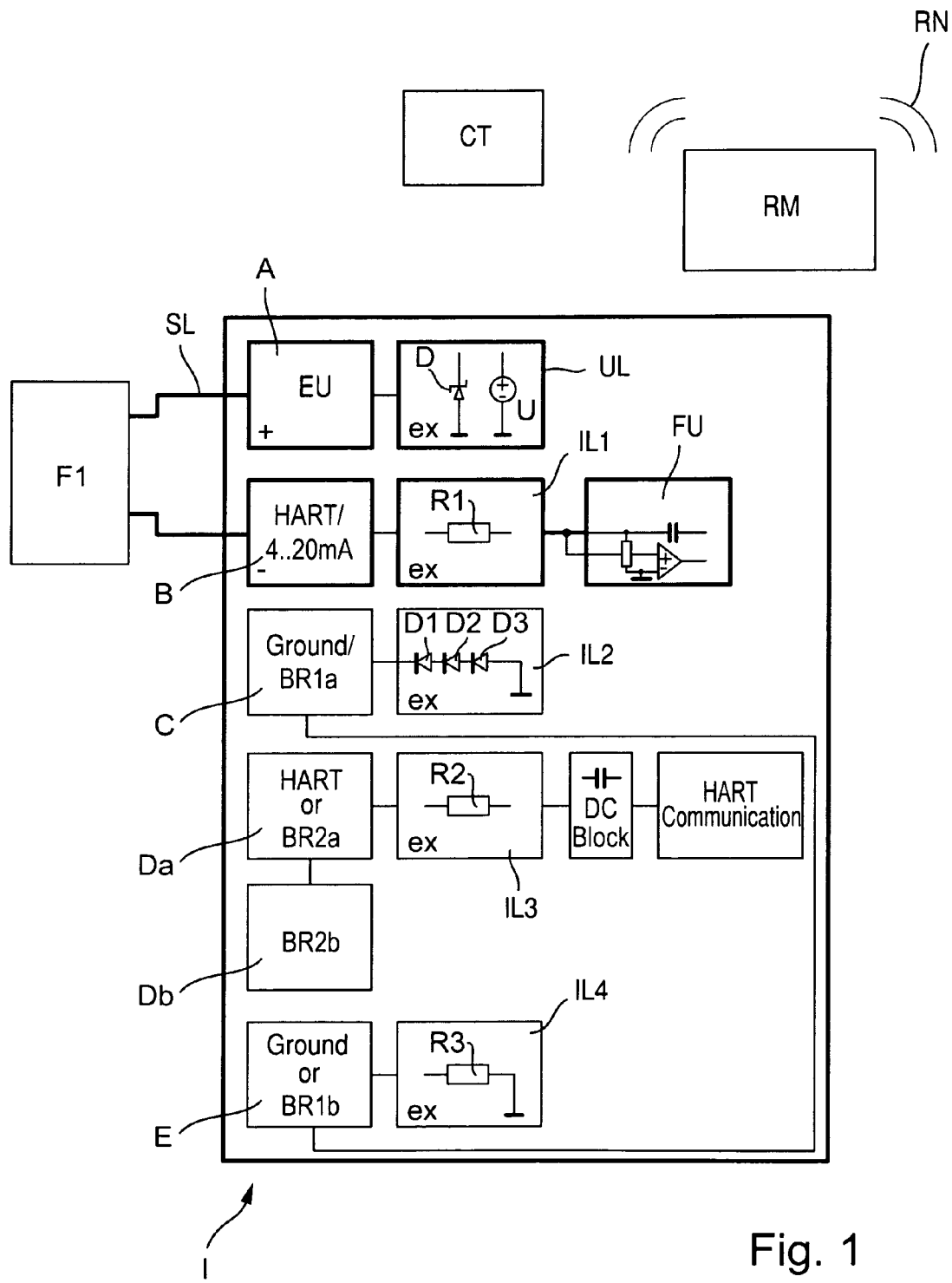
FIG. 1 the arrangement of the connection terminals of the wireless adapter of the invention in the case of the connection of a field device, which is supplied with energy via the wireless adapter.

FIG. 1 shows the arrangement of the connection terminals A, B, C, Da, Db, E of the interface of the invention in the case of the connection of a field device F1, which is supplied with energy by the wireless adapter via the energy supply unit EU. The energy supply unit EU also feeds the wireless adapter.

The field device F1 involves, thus, a two-wire field device. Two-wire-field devices distinguish themselves in that the energy supply and the transmission of the measured value, e.g. of a 4-20 mA-measured value, and/or the digital communication, occur via the same two-wire line SL.

The first connection terminal A, which serves as plus pole, is the energy supply terminal, to which the energy supply unit EU of the interface is connected. The second connection terminal B involves a first communication terminal, which supports either digital communication corresponding to the particular communication protocol, e.g. the HART-protocol, and/or the ascertaining of the analog electrical current signal, especially of a 4-20 mA-electrical current signal.

To ensure Ex-protection, a voltage limiter UL is switched in parallel with the energy supply unit EU. Through the diode D switched in parallel to the voltage source U, a direct voltage is provided which can reach at a maximum the Zener voltage of the diode D (blocking direction) and corresponds to the operating voltage of the diode D in the forward direction. The second connection terminal B, which represents the minus pole, includes an electrical current limiter IL1 for Ex-protection-reasons. Here the electrical current is limited by the resistor R1. Through the electrical current, and voltage, limiting, it is assured that only a power sufficient for Ex-specifications is made available on the connection terminals A, B.

The analog electrical current signal and/or the HART-signal are transmitted via the functional unit FU to a microprocessor (not separately illustrated in FIG. 1). The functional unit FU supports either digital communication, e.g. the HART communication or supports the measuring of the electrical current value.

Figure 2:
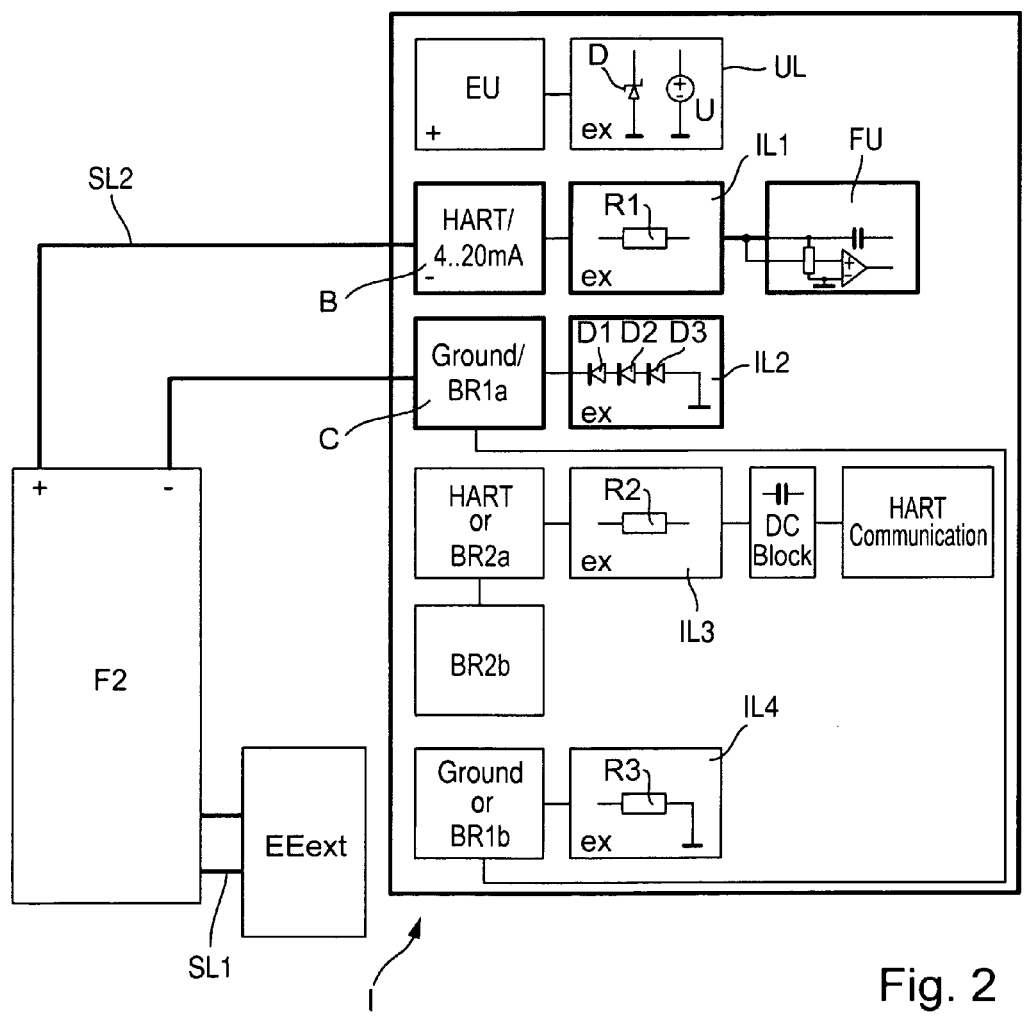
FIG. 2 the arrangement of the connection terminals of the wireless adapter of the invention for the case in which a four-wire-field device is connected to the wireless adapter.

FIG. 2 shows the arrangement of the connection terminals A, B, C, Da, Db, E of the wireless adapter of the invention for the case in which a four-wire-field device F2 is connected to the interface I of the wireless adapter. Via the two connecting lines SL1, the field device F2 is supplied with energy by an external energy supply unit EUext. Via the two connecting lines SL2, the field device F2 is connected with the second connection terminal B and the third connection terminal C. The function of the connection terminal B and of the components connected to it was already explained in connection with FIG. 1. The connection terminal C, in the case of this embodiment, has the function of a ground connection for the external energy supply unit EUext. The maximum flowing electrical current is limited by the electrical current limiter IL1. An additional protection against wrong connections is composed of three diodes D1, D2, D3 switched in series. As a result of the triple redundance, it is assured that the protection still effectively works, even in the case that two of the three diodes stop working. The diodes D1, D2, D3 furthermore cause that no internal capacitances or inductances act outwardly in the direction of the field device F2. The high safety requirements of the Ex protection type ex-ia are, thus, fulfilled.

Figure 3:
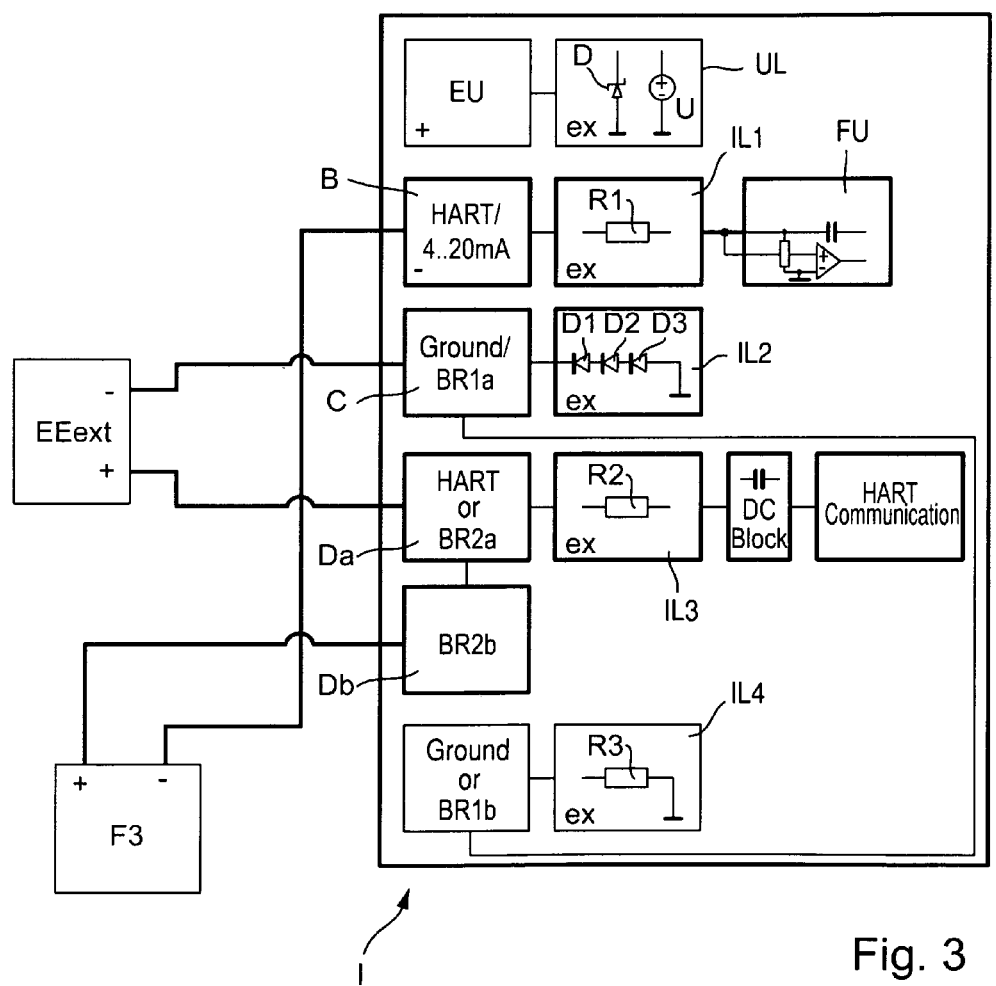
FIG. 3 the arrangement of the connection terminals of the wireless adapter of the invention for the case in which a two-wire field device and an external power supply are connected to the wireless adapter.

FIG. 3 shows the arrangement of the connection terminals A, B, C, Da, Db, E of the wireless adapter of the invention for the case in which a two-wire field device F3 and an external power supply, or an external energy supply unit EUext, are connected to the wireless adapter. The fourth connection terminal D is doubly embodied. In particular, the two connection terminals Da, Db work functionally equally, since they are connected with one another via a bridge BR2a, BR2b. In such a case, the two-wire field device F3 is connected to the second connection terminal B and to the fourth connection terminal Db. The external energy supply unit EUext is connected with the third connection terminal C and the fourth connection terminal Da. The power supply of the wireless adapter and of the field device F3 occurs via the external energy supply unit EUext.

Figure 4:
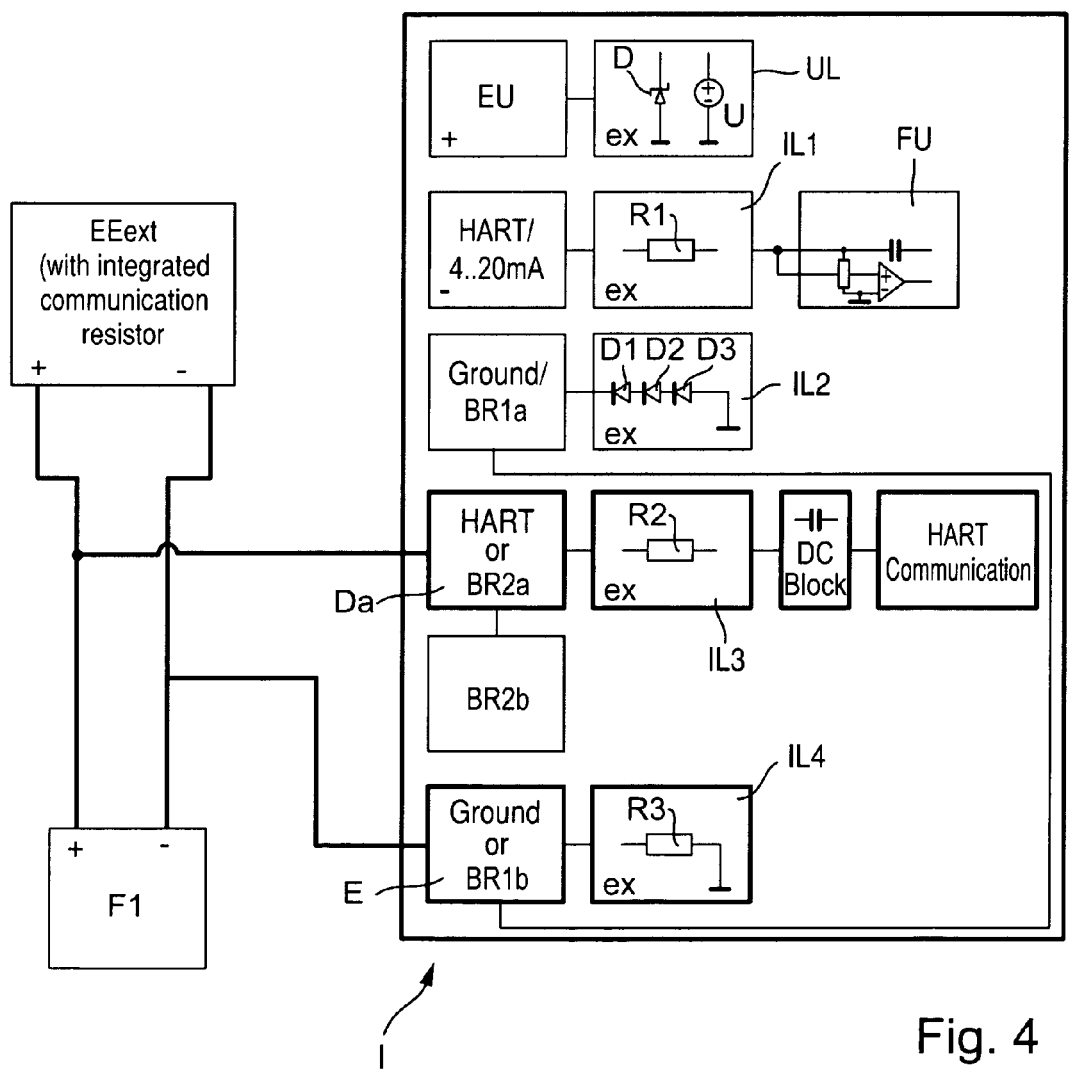
FIG. 4 a first embodiment of the arrangement of the connection terminals of the wireless adapter of the invention for the case in which the wireless adapter works in modem operation with a two-wire field device.

FIG. 4 shows a first embodiment of the arrangement of the connection terminals A, B, C, Da, Db, E of the wireless adapter of the invention, presented for the case where the wireless adapter works with a two-wire field device F1 in modem operation. The fourth connection terminal Da and the fifth connection terminal E are used in the case of this embodiment. The fifth connection terminal E can involve, depending on connected field installation F1, F2, EUext, SU, a high ohm ground connection—which is so in the case of the field installation of FIG. 4—or a bridge BR1b, BR1a to the third connection terminal C.

For the case in which the wireless adapter is used with a two-wire field device F1 for modem operation, the fourth connection terminal Da and the fifth connection terminal E are connected to the two-wire line SL via the two communication lines KL. The two-wire line SL connects the two-wire field device F1 with the external energy supply unit EUext and enables the digital communication.

Figure 5:
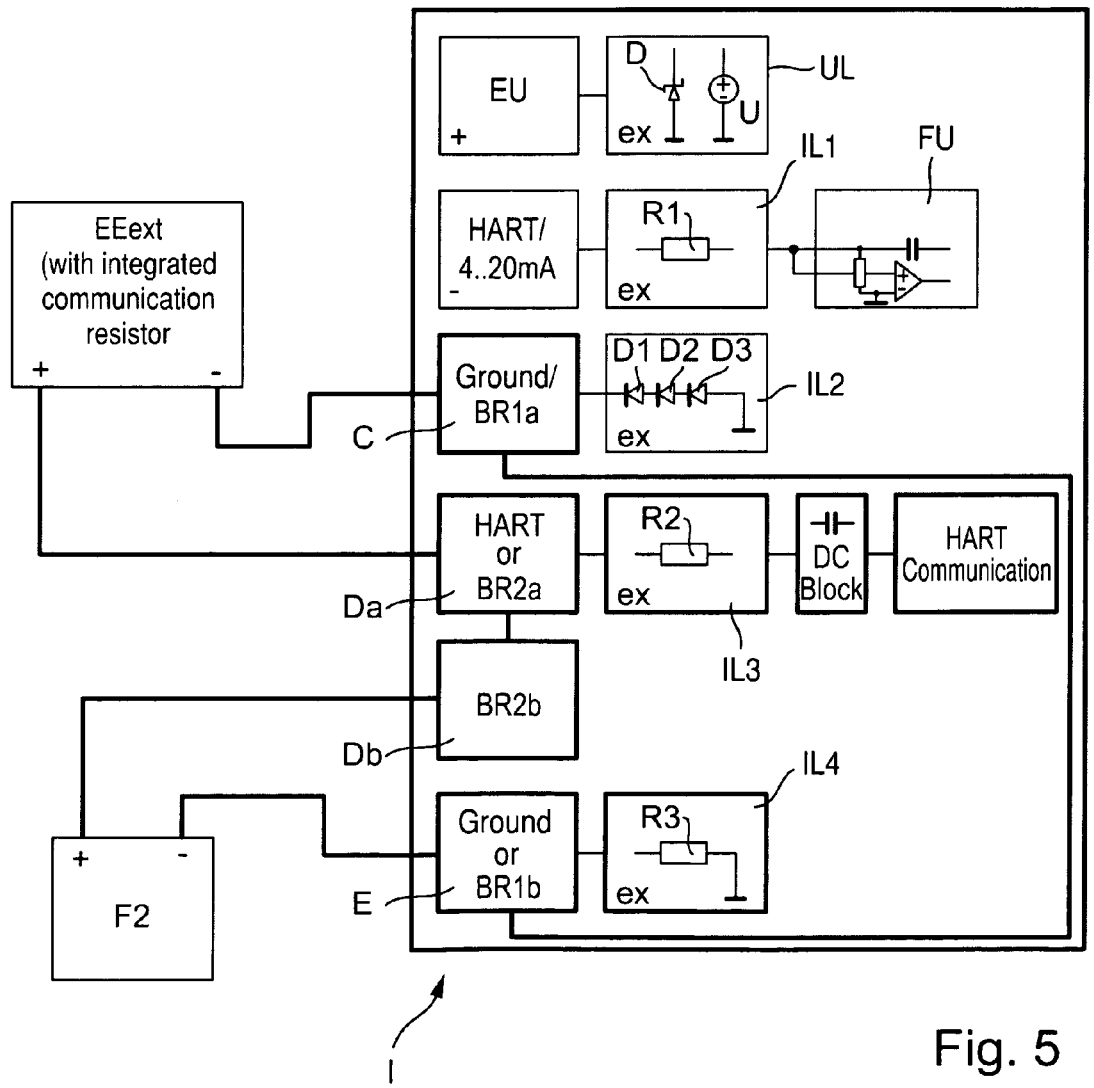
FIG. 5 a second embodiment of the arrangement of the connection terminals of the wireless adapter of the invention for the case in which the wireless adapter works in modem operation with a four-wire-field device.

FIG. 5 shows a second embodiment of the arrangement of the connection terminals A, B, C, Da, Db, E of the wireless adapter of the invention for the case in which the wireless adapter works with a four-wire-field device F2 in modem operation. The energy supply unit EUext, which feeds the field device F2, is connected separately to the wireless adapter. The energy supply unit EUext is connected with the third connection terminal C and the fourth connection terminal Da, wherein here the third connection terminal C and the fifth connection terminal E are connected with one another via a bridge BR1b, BR1a. The field device F2 is connected to the wireless adapter via the fourth connection terminal Db and the fifth connection terminal E.

Figure 6:
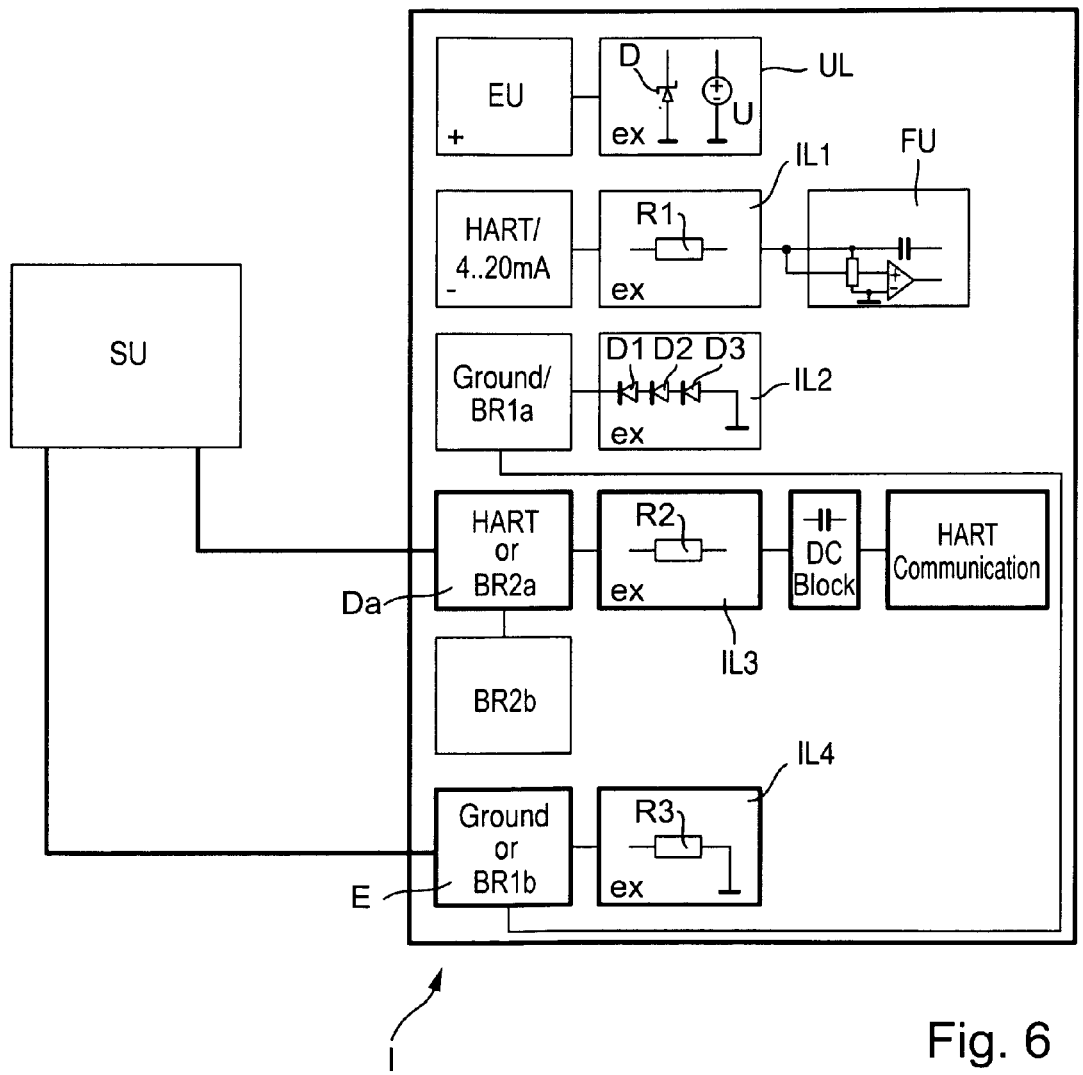
FIG. 6 the arrangement of the connection terminals of the wireless adapter of the invention for the case in which a servicing device is connected to the wireless adapter.

FIG. 6 shows the arrangement of the connection terminals A, B, C, Da, Db, E of the wireless adapter of the invention, presented for the case where a servicing device SU is connected to the wireless adapter. The servicing device SU serves, for example, for parametering the wireless adapter. It can also be utilized for start-up or for diagnostic purposes. The servicing device SU is connected to the wireless adapter, i.e. to the interface of the wireless adapter, via the fourth connection terminal Da, thus the second communication terminal, and via the fifth connection terminal E, which serves as ground terminal.

The invention claimed is:

1. A universal interface for a wireless adapter, which supports a communication protocol used in automation technology, wherein associated with the wireless adapter are a first energy supply unit for energy supply of the wireless adapter and a radio module for communication with a superordinated control unit via a radio network, said universal interface has:
at least five connection terminals, which are so embodied that, as a function of a field installation to be connected, a portion of said connection terminals are connectable either with different embodiments of field devices, or with a servicing device, or to use the wireless adapter in modem operation, and
whereas depending on said field installation the occupation of said connection terminals is changed and the individual connection terminals are usable in different combinations;
wherein a third connection terminal of said at least five connection terminals is, depending an said field installation that is to be connected, a ground terminal for an external energy supply unit or a bridge for connection to a fifth connection terminal of said at least five connection terminals and
wherein for the case in which the wireless adapter works with a field device that is fed via the external energy supply unit in modem operation, the external energy supply unit is connected with said third connection terminal of said at least five connection terminals and said fourth connection terminal of said at least five connection terminals;
said third connection terminal of said at least five connection terminals and said fifth connection terminal of said at least five connection terminals are connected with one another via a bridge; and
the field device is connected to the wireless adapter via said fourth connection terminal of said at least five connection terminals and said fifth connection terminal of said at least five connection terminals.

2. The universal interface as claimed in claim 1, wherein:
a first connection terminal of said at least five connection terminals is an energy supply terminal connected with an energy supply unit.

3. The universal interface as claimed in claim 1, wherein:
a second connection terminal of said at least five connection terminals is a first communication terminal, which supports digital communication corresponding to said communication protocol and/or ascertaining of an analog electrical current signal.

4. The universal interface as claimed in claim 1, wherein:
a fourth connection terminal said at least five connection terminals is a second communication terminal, which supports digital communication corresponding to said communication protocol.

5. The universal interface as claimed in claim 1, wherein:
said fifth connection terminal of said at least five connection terminals, depending on connected field installation, involves a high ohm ground connection or a bridge to said third connection terminal of said at least five connection terminals.

6. The universal interface as claimed in claim 1, wherein:
associated with each of said connection terminals is a voltage limiter and/or an electrical current limiter, which are so designed that, in the case of connection of a field installation to the wireless adapter, available power is so sized that use of the wireless adapter is possible in connection with the field installation in an explosion-endangered area.

7. The universal interface as claimed in claim 1, wherein:
said communication protocol is one of:
HART-protocol, the Profibus protocol, and the Foundation Fieldbus protocol.

8. The universal interface as claimed in claim 2, wherein:
a two-wire field device fed by said first energy supply unit of the wireless adapter is connectable to said first connection terminal of said at least five connection terminals and to said second connection terminal of said at least five connection terminals; and
energy supply and providing of a measured value occur for said two-wire field device via a single two-wire line.

9. The universal interface as claimed in claim 3, wherein:
a four-wire-field device, which is supplied with energy via a first two-wire line and an external energy supply unit, is connectable with the wireless adapter via said second of said at least five connection terminals and said third connection terminal of said at least five connection terminals, so that a digital communication signal and/or an electrical current signal representing the measured value are/is transmittable via said second two-wire line connected to said second connection terminal of said at least five connection terminals and to said third connection terminal of said at least five connection terminals of the wireless adapter.

10. The universal interface as claimed in claim 3, wherein:
for the case in which a two-wire field device and an external energy supply unit are to be separately connected to the wireless adapter, the two-wire field device is connected to said second connection terminal of said at least five connection terminals and to said fourth connection terminal of said at least five connection terminals, and the external energy supply unit is connected with said third connection terminal of said at least five connection terminals and said fourth connection terminal of said at least five connection terminals.

11. The universal interface as claimed in claim 4, wherein:
said fourth connection terminal of said at least five connection terminals is doubly embodied, or wherein two of said fourth connection terminal of said at least five connection terminals work functionally equally, since they are connected with one another via a bridge.

12. The universal interface as claimed in claim 4, wherein:
for the case in which the wireless adapter is used with a two-wire field device for modem operation, said fourth connection terminal of said at least five connection terminals and said fifth connection terminal of said at least five connection terminals are connected via the two communication lines to the two-wire line, which connects the two-wire field device with the external energy supply unit and via which digital communication occurs.

13. The universal interface as claimed in claim 4, wherein:
for the case in which the wireless adapter is serviced by means of a service unit, the service unit is connectable to said fourth connection of said at least five connection terminals terminal and said fifth connection terminal of said at least five connection terminals.

\* \* \* \* \*